Nov. 19, 1957 W. H. KAGLEY ET AL 2,813,561
FRUIT DISLODGMENT FINGER FOR FRUIT PITTING MACHINE
Filed Oct. 17, 1955 2 Sheets-Sheet 1

WILLIAM HERBERT KAGLEY
BENTLEY J. MILAM
INVENTORS
Huebner, Beehler, Worrel & Herzig
BY

ATTORNEYS.

Nov. 19, 1957   W. H. KAGLEY ET AL   2,813,561
FRUIT DISLODGMENT FINGER FOR FRUIT PITTING MACHINE
Filed Oct. 17, 1955   2 Sheets-Sheet 2

WILLIAM HERBERT KAGLEY
BENTLEY J. MILAM
INVENTORS
Huebner, Beehler, Worrel & Herzig
BY
ATTORNEYS.

United States Patent Office 2,813,561
Patented Nov. 19, 1957

2,813,561

FRUIT DISLODGMENT FINGER FOR FRUIT PITTING MACHINE

William Herbert Kagley, Lindsay, and Bentley J. Milam, Strathmore, Calif., assignors to Lindsay Ripe Olive Company, Lindsay, Calif., a corporation of California Application October 17, 1955, Serial No. 540,711

6 Claims. (Cl. 146—27)

The present invention relates to a machine for pitting fruit, such as olives, and in particular to improvements over certain features of the invention described and claimed in United States patent of Edward P. Drake, Fred J. Alberty, and William H. Kagley, No. 2,341,857, granted February 15, 1944, for Fruit Pitting Machine.

In removing pits from olives by a machine of the type identified above, the olives are individually firmly grasped in a predetermined, aligned position while a punch enters from one end of the olive and is forced longitudinally therethrough. During this operation, the olive is forced into an olive receiving cup on the end of a die. The olive pit is pushed out through the end of the olive by the punch into a bore passing through the cup.

The die and the punch containing the pitted olive impaled thereon, are advanced to fruit stripping means comprising a member having an arcuate slot open at one end and adapted to permit the punch to enter transversely. The slot is sufficiently narrow to restrain fruit upon retraction of the punch from the die so as to strip the pitted olive from the tip of the punch. The stripped olive is collected in a pitted fruit receptacle.

Occasionally, during the pitting operation, the olive is forced against the concave surface of the olive receiving cup on the extreme outer end of the die member in a manner so that it becomes stuck therein. Probably the most common cause of a sticking olive is the creation of a vacuum between the surface of the olive and the face of the die cup. If the olive, thus inadvertently stuck in the die, is not dislodged during withdrawal of the punch from the die, and the punch retreats leaving the olive in the die, the pitted olive, thus stuck in the olive receiving cup of the die, will be carried by the die until the olive pit is expelled from the front end of the bore passing through the cup. The pressure of the pit against the stuck olive dislodges it and both the olive and the pit are dropped into the receptacle for olive pits. The pitted olive thus is lost among the olive pits.

Accordingly, it is an important object of the present invention to provide, in a machine of this general character, a fruit dislodging means for loosening fruit inadvertently stuck in the fruit receiving cup on the end of the die before the punch is withdrawn from the die after the pit is punched from the fruit.

Another object is to provide in such a machine a flexible finger for breaking the contact between a pitted olive and the concave surface of the olive receiving cup at the end of the die before the end of the punch is retracted from the pitted olive, so that the pitted olive will remain impaled on the punch to be stripped from the latter at the proper point in the cycle.

A further object is to provide a flexible preferably resilient finger positioned in front of the fruit stripping means in the path of a pitted olive impaled on the punch and in contact with the olive receiving cup of the die, for resiliently engaging and breaking the contact between the pitted olive and the olive receiving cup of the die so that the impaled, pitted olive will remain impaled on the punch during the withdrawal thereof from the die and the pitted olive can be stripped from the end of the punch by the fruit stripping means.

Other objects and advantages will appear from the further description in the specification and the illustration in the drawings.

Figure 1:
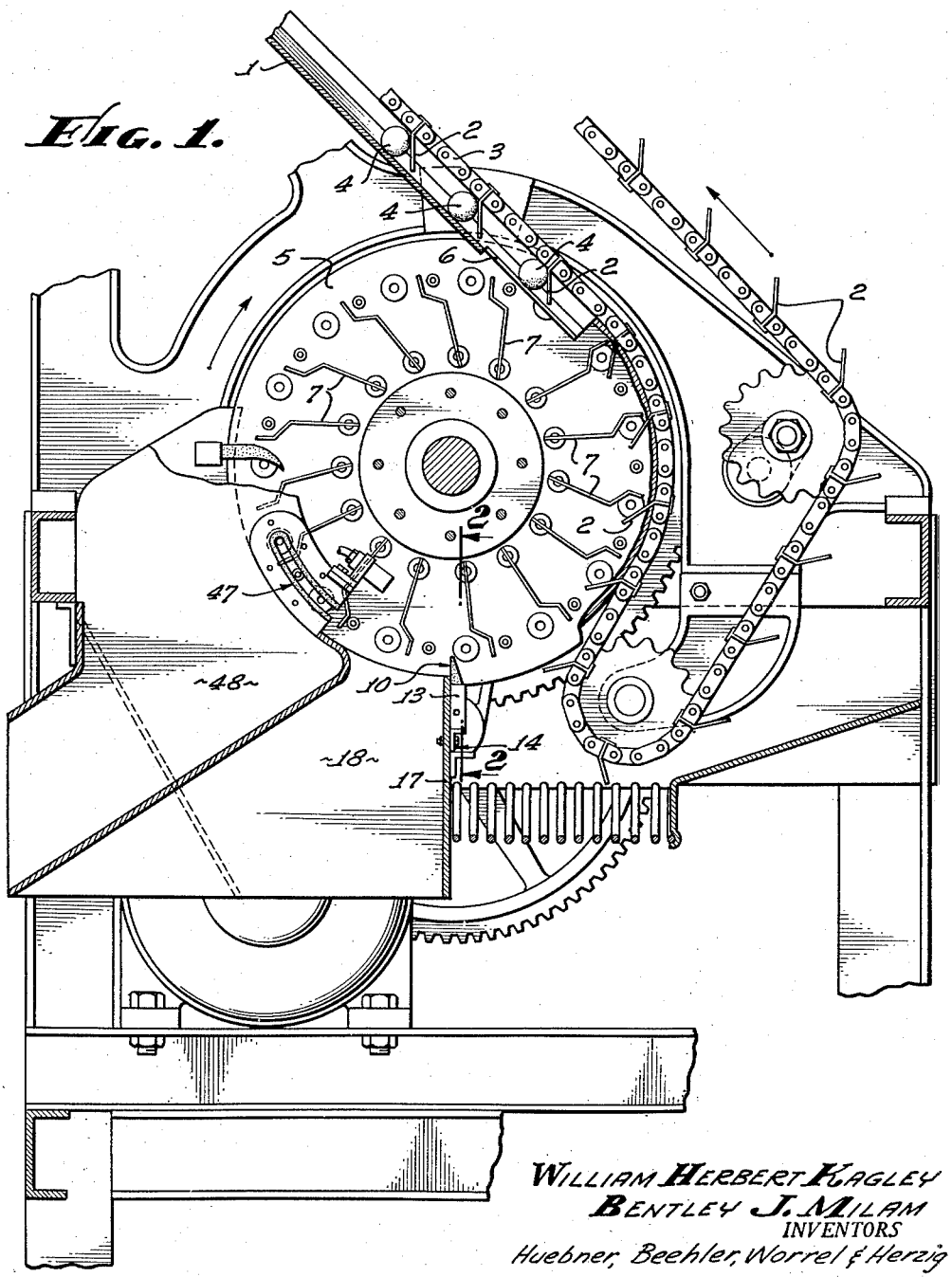
Figure 1 is a vertical cross-sectional view of the olive pitting machine, similar to Figure 27 in the patent referred to above, showing a flexible olive dislodging finger mounted in the path of the die and punch at a point in front of the fruit stripping means.
Figure 2:
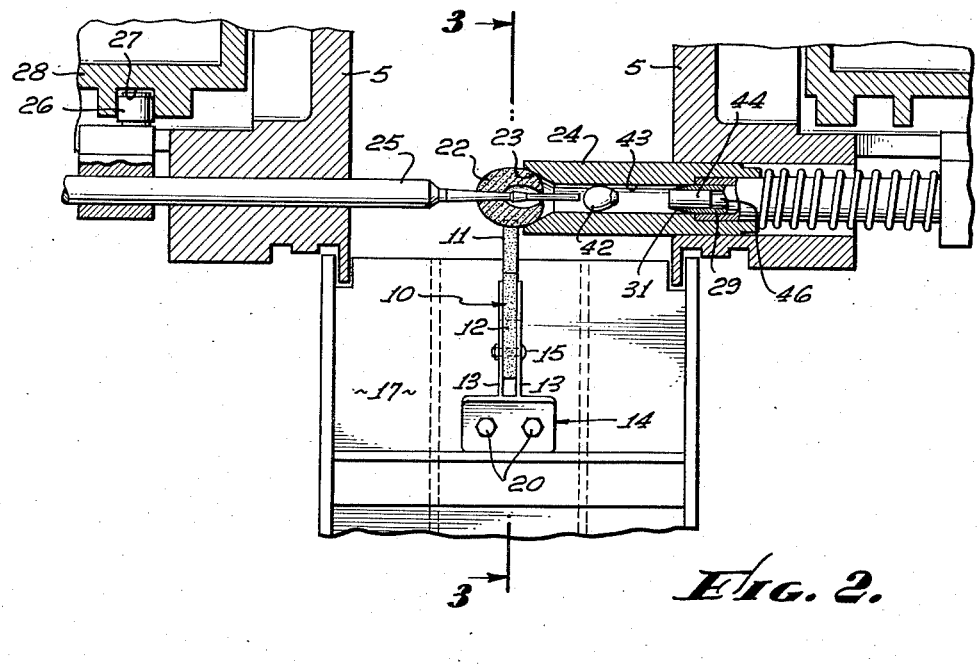
Figure 2 is a partial, enlarged longitudinal sectional view of the machine taken on the line 2—2 of Figure 1 showing the olive dislodging finger engaging an olive partially contained in the olive receiving cup on the end of a die, and impaled on the end of the punch.

In the fruit pitting machine described in the patent to which reference was made above, fruit, such as olives, is fed continuously to olive feeding chute means indicated at 1. Spacer or gripper members 2 are fastened to links of an endless chain 3 in spaced relationship, such as to every third link, and initially serve to space the individual olives 4 as they roll or slide downward in chute 1 toward revolving drums 5. Two such drums are mounted in axially spaced relationship as indicated in Figure 2.

As the olives 4 pass through chute 1, they seek their most natural rolling position. This position is rapidly assumed no matter what the position of each olive as it is fed into the chute. The olive invariably assumes a position with its longitudinal axis transverse of the chute 1 as it approaches drum 5.

A slot 6, cut through the bottom of chute 1 for a distance near its lower end, is not wide enough to affect the movement or position of the olives 4 but permits the narrow gripper fingers 7 to enter behinr the spaced, aligned olives and close in upon the same to grip the olives 4, each one between a gripper finger 7 and a spacer member 2, as shown.

The endless chain 3 follows for a distance the contour of the drums 5, which form part of the punch and die mechanism. Partial views of a punch and a die member are shown at 25 and 24, respectively, in Figures 2 and 4.

A gripper finger 7 and a spacer member 2, while gripping an olive 4 between them, travel together in this relationship in a circular path with rotating drums 5 approximately to the position where the olive is seized by the punch 25 and the die 24, whereupon the spacer member 2 takes off tangentially and returns cyclically through an endless path. Gripper finger 7 is retracted by a cam action (not shown) and returns cyclically with the continuous rotation of drums 5.

The punches 25 and dies 24 are mounted circumferentially in spaced relationship with respect to each other on each of the two drums 5. Furthermore, the punches and dies are arranged in the peripheral region of the drums in alternating relationship. The drums 5, in turn, are rotatably mounted in axially spaced relationship with respect to each other so that the punches on one drum are positioned axially opposite the dies on the other drum, and the dies on the first mentioned drum are axially opposite the punches on the second mentioned drum. This is accomplished by orienting and rigidly connecting the two axially spaced drums so that they rotate together as a unit.

Figure 4:
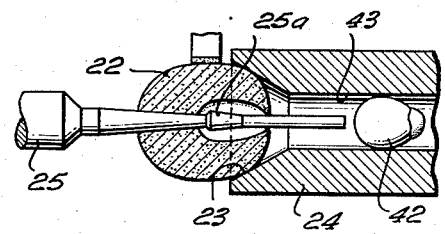
Figure 4 is an inverted fragmentary, enlarged longitudinal sectional view taken on the line 4—4 of Figure 3.

The relationship between a single die and punch is illustrated in Figs. 2 and 4. For convenience, a particular olive of the several olives 4 is designated by reference character 22 and a pit which is removed from the olive 22 is designated by the reference character 42.

During the continuous cyclic operation of the fruit pitting machine, the punch 25 under the control of a cam follower 26 in a cam raceway 27 on a cam barrel 28, enters the olive 22 from one end and, at a later stage, is forced longitudinally therethrough. The punch forces the olive against the conical surface of olive receiving cup 23 on the end of die 24. A coring tool 29 is slidable within the die 24 and has a knife 31 with which it makes an incision in the end of the olive 22 while the coring tool is extended. After making the incision, the coring tool 29 is retracted and the punch 25 is forced through the olive 22. The olive pit 42 is pushed out through the end of the olive 22, while the olive is supported by the cup 23 of the die, into a longitudinal central bore 43 passing through the die.

Later the pit 42 is expelled from the front end of the bore 43 by the forward movement in the die 24 of a head 44, on the end of a rod 46. The olive pit 42 is dropped into hopper 18 for olive pits as the die 24 passes over the mouth of the hopper. The pitted olive 22 in normal operation, is withdrawn from the cup 23 while impaled on the tip of the punch 25. The impaled olive then is carried to an arcuately slotted olive stripper 47. This stripper is open at its forward end to permit the punch to enter transversely and is sufficiently narrow to restrain olives upon retraction of the punch. The olive is stripped from the tip of the punch 25 as the punch is retracted from the slot. The stripped, pitted olive then drops into a receptacle 48 for pitted olives.

Instead of the normal, desired operation described above, and in the absence of our present improvement, the pitted olive sometimes becomes stuck in the cup 23 at the end of die 24 and remains stuck therein notwithstanding the barb 25a on the punch 25, and the punch is pulled prematurely from the olive. The sticking usually occurs by reason of a vacuum which is created when the olive is pressed against the wall of the cup, and in some instance may be slightly flattened against such wall. The pitted olive remains lodged in cup 23 until the pit 42 is expelled from the front end of the bore 43 by the forward movement in the die 24 of the head 44 as described above. The pressure of the pit 42 against the pitted olive 22, as the pit is urged against the stuck olive, will dislodge the olive from the cup 23. Consequently, the pitted olive and olive pit both are dropped into a receptacle intended only for olive pits. Thus the pitted olive is lost among the olive pits for all practical purposes, unless recovered by a separating process which adds expense to the operation.

To avoid such losses of the pitted olives, the flexible preferably resilient finger 10 has been provided to insure against any pitted olives 22 remaining stuck in the cup of the die. Each olive is engaged by the finger at a point in its orbital travel after the pit 42 is pushed through the olive into the bore 43, as shown in Figures 2 and 4, and before the pitted, impaled olive is stripped from the tip of punch 25 by the stripper 47.

The finger 10 preferably is made of a resilient material such as natural or synthetic rubber. It preferably is made in the form of an elongated strip beveled at its upper end 11. The shank or handle portion 12 of the finger preferably is clamped between the prongs 13 of a bifurcated bracket 14 by any suitable means, such as a bolt 15 passing through the finger and the prongs of the bracket.

The bracket 14 is conveniently fastened to a vertical wall 17 of the hopper 18. The attachment of the bracket 14 to the wall 17 preferably is made by two horizontally spaced bolts 20. In this manner, the bracket 14 is rigidly fixed against turning and the finger 10 is positioned vertically in the orbital path of the pitted olives.

Figure 3:
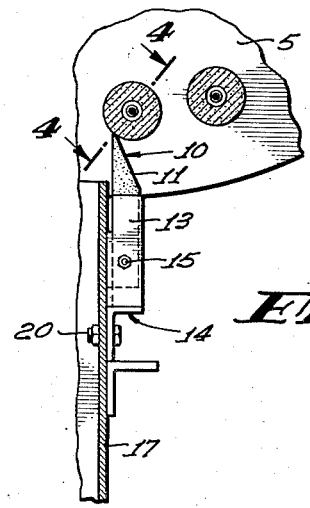
Figure 3 is a fragmentary, enlarged detail view taken on the line 3—3 of Figure 2 showing the olive dislodging finger of Figure 1 in engagement with an olive after the pitting operation, but before the stripping operation.

It is preferably located so that the tip of the beveled end 11 is slightly above the bottom surface of the traveling olives 22, as best shown in Figures 2 and 3, and so that its vertical central plane is in approximate alignment with the vertical center transverse plane of an olive 22. The same olive alignment prevails whether the punch 25 and the die 24 are positioned as shown in Figures 2 to 4, or whether in reversed order with a die on the left side instead of on the right side of the finger, and an aligned punch on the right side instead of the left side. Thus the finger is aligned with the olives between each successive punch and die pair even though the successive punch and die pairs are oppositely arranged.

The resiliency and softness of the finger is gauged to avoid injury to the olives but is made firm enough to "tickle" the olives sufficiently to break any vacuum or other cause of adherence and to assure that any olives which might otherwise adhere are dislodged from the receiving cup.

As noted, the finger 10 is positioned to encounter the olives in the cycle of operations at an orbital point beyond the region in which the pitting operation occurs and in advance of the region in which the fruit stripping operation occurs, and before the olive pit 42 is expelled from bore 43 in die 24 and dropped into hopper 18 for pits. This location radial to the axis of the drums can easily be determined by observation of the punch and die action as the drums rotate. In the embodiment shown, one wall of the pit hopper is correctly located to serve as a mounting panel. The positioning axially of the drums is at a point beyond but adjacent to the end of the die when fully advanced. With a pair of drums as shown in the present embodiment, this point is midway between them.

While the instant invention has been shown and described herein in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

What we claim as our invention is:

1. In a fruit pitting machine, the combination of a traveling die and punch carrier, a plurality of cooperating dies and punches mounted on the carrier, means for advancing and retracting the punches and dies relatively to each other in synchronism with the travel of the carrier to remove pits from individual pieces of fruit held between the dies and punches, a resilient finger mounted adjacent the carrier for dislodging pieces of fruit from the dies, a slotted fruit stripping device adapted to permit each of the punches to enter transversely, and means retracting the punches within the fruit stripping device whereby individual pieces of fruit are removed from each of the punches.

2. In a fruit pitting machine, a traveling die and punch carrier, a plurality of cooperating dies and punches mounted on the carrier, means for advancing and retracting the punches and dies relatively to each other in synchronism with the travel of the carrier to remove pits from individual pieces of fruit, means linked to each of the dies for ejecting pits from the dies, a resilient finger mounted adjacent the carrier for disengaging pieces of fruit from each of the dies, a slotted stripping device adapted to permit the punch to enter transversely, and means for retracting the punches within the fruit stripping device for removing individual pieces of fruit from the punches.

3. In a fruit pitting machine, the combination of a rotatable drum, a plurality of cooperating dies and punches mounted on the drum, means for feeding individual pieces of fruit to the dies and punches, means for advancing and retracting the dies and punches relatively to each other as the drum rotates whereby each of the individual pieces of fruit is engaged with a die and a punch and the punch is thrust through the piece of fruit to push the pit from the fruit into the die, a fruit stripping device mounted adjacent the drum into which the punches travel and retract to remove the impaled pieces of fruit from the punches, and a resilient finger mounted adjacent the drum which engages the individual pieces of fruit to disengage each piece of fruit from the dies prior to entry of the punches into the fruit stripping device.

4. In a fruit pitting machine, the combination of a movable carrier, a plurality of cooperating dies and punches mounted on the movable carrier, means supplying individual pieces of fruit to the dies and punches as the movable carrier carries the dies and punches past the fruit supplying means, means advancing and retracting the dies and punches relatively to each other to cause each of the individual pieces of fruit to be engaged by a die and punch and a pit removed therefrom with each individual piece of fruit being impaled upon a punch, a resilient finger mounted adjacent the movable carrier for disengaging each of the pieces of fruit from each of the dies as the movable carrier carries the dies and punches past the resilient finger, a fruit stripping device mounted adjacent the movable carrier for receiving each of the punches having a piece of fruit impaled thereon, and means linked to the punches for retracting the punches within the fruit stripping device whereby each of the impaled pieces of fruit is removed from each of the punches.

5. In a fruit pitting machine of the type in which cooperating dies and punches engage individual pieces of fruit and the dies and punches are advanced and retracted relatively to each other so that a pit is pushed from the fruit by a punch into a die with the piece of fruit being impaled on the punch, the combination of a resilient finger, means fastening the resilient finger adjacent the dies for disengaging each of the pieces of fruit from the dies, a fruit stripping device mounted adjacent the punches for receiving the punches having pieces of fruit impaled thereon, and means retracting the punches within the fruit stripping device whereby each individual piece of fruit impaled on a punch is removed from the punch.

6. In a fruit pitting machine, the combination of a drum, a plurality of cooperating dies and punches mounted on the drum, means for feeding individual pieces of fruit one by one and placing each of the pieces of fruit between a die and a punch, means advancing and retracting the dies and punches relatively to each other as the drum rotates whereby a punch is thrust through each of the pieces of fruit engaged with a die to push a pit into the die with the fruit being impaled upon the punch, a resilient finger mounted adjacent the drum for disengaging each of the pieces of fruit from each of the dies to insure that each of the pieces of impaled fruit is supported solely by the punch, a fruit stripping device mounted adjacent the drum for receiving each of the punches having a piece of fruit impaled thereon as the drum rotates, means retracting the punches within the fruit stripping device for removing pieces of fruit impaled on the punches and a receptacle mounted adjacent the fruit stripping device for collecting pitted fruit stripped from the punches.

No references cited.